United States Patent
Lee

(10) Patent No.: US 10,272,897 B2
(45) Date of Patent: Apr. 30, 2019

(54) CONTROL METHOD OF POWER TRAIN FOR HYBRID VEHICLE AND CONTROL SYSTEM FOR THE SAME

(71) Applicant: Hyundai Motor Company, Seoul (KR)

(72) Inventor: Young Jun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 179 days.

(21) Appl. No.: 15/254,362

(22) Filed: Sep. 1, 2016

(65) Prior Publication Data

US 2017/0297554 A1    Oct. 19, 2017

(30) Foreign Application Priority Data

Apr. 15, 2016   (KR) ........................ 10-2016-0046372

(51) Int. Cl.
| | |
|---|---|
| *B60W 20/10* | (2016.01) |
| *B60W 10/06* | (2006.01) |
| *B60W 10/08* | (2006.01) |
| *B60K 6/448* | (2007.10) |
| *B60W 30/19* | (2012.01) |

(Continued)

(52) U.S. Cl.
CPC ............ *B60W 10/08* (2013.01); *B60K 6/448* (2013.01); *B60W 10/06* (2013.01); *B60W 20/11* (2016.01); *B60W 20/15* (2016.01); *B60W 30/19* (2013.01); *B60W 2710/0666* (2013.01); *B60W 2710/083* (2013.01); *Y10S 903/905* (2013.01); *Y10S 903/906* (2013.01)

(58) Field of Classification Search
CPC ...... B60W 10/08; B60W 10/06; B60W 20/11; B60W 30/19; B60W 2710/0666; B60W 2710/083; B60K 6/448; Y10S 903/905; Y10S 903/906
See application file for complete search history.

(56) References Cited

U.S. PATENT DOCUMENTS 5,195,600 A * 3/1993 Dorgan ............... B60K 17/046
                                         180/305
5,492,189 A * 2/1996 Kriegler ................. B60K 6/12
                                      180/65.23

(Continued)

FOREIGN PATENT DOCUMENTS

| JP | 2014-213754 A | 11/2014 |
|---|---|---|
| KR | 10-2007-0029096 | 3/2007 |

(Continued)

*Primary Examiner* — Tuan C To
(74) *Attorney, Agent, or Firm* — Mintz Levin Cohn Ferris Glovsky and Popeo, P.C.; Peter F. Corless

(57) ABSTRACT

A control method of a power train for a hybrid vehicle is provided. The method includes determining whether an engine corresponds to an optimal operating point when intervention for upshifting is demanded during an HEV driving mode and determining whether an amount of demanded intervention is equal to or less than a value adding maximum intervention torques of a drive motor and an HSG. Each intervention torque of the drive motor and the HSG is determined to adjust a whole energy-collect rate by the drive motor and the HSG to a maximum value of the amount of demanded intervention, and simultaneously, the value adding the intervention torques of the drive motor and the HSG satisfies the amount of demanded intervention.

9 Claims, 2 Drawing Sheets

(51) Int. Cl.
   *B60W 20/15*   (2016.01)
   *B60W 20/11*   (2016.01)

(56) References Cited

U.S. PATENT DOCUMENTS

| | | | | |
|---|---|---|---|---|
| 5,939,794 | A * | 8/1999 | Sakai | B60K 6/46 290/40 A |
| 6,047,681 | A * | 4/2000 | Scherer | F02D 37/02 123/406.46 |
| 6,301,529 | B1 * | 10/2001 | Itoyama | B60K 6/485 701/22 |
| 7,027,908 | B2 * | 4/2006 | Esteghlal | F02D 31/006 123/406.46 |
| 7,392,871 | B2 * | 7/2008 | Severinsky | B60H 1/004 180/65.28 |
| 7,400,962 | B2 * | 7/2008 | Maier-Landgrebe | B60W 10/06 180/197 |
| 8,037,955 | B2 * | 10/2011 | Huber | B60W 10/06 180/65.28 |
| 8,352,106 | B2 * | 1/2013 | Falkenstein | B60K 6/445 701/22 |
| 8,374,771 | B2 * | 2/2013 | Falkenstein | B60K 6/48 701/105 |
| 2002/0117339 | A1 * | 8/2002 | Nakashima | B60K 6/48 180/65.25 |
| 2004/0122563 | A1 * | 6/2004 | Okada | G05B 23/00 701/1 |
| 2007/0056783 | A1 * | 3/2007 | Joe | B60K 6/48 180/65.265 |
| 2007/0240921 | A1 * | 10/2007 | Katzenberger | B60K 6/48 180/65.28 |
| 2007/0250239 | A1 * | 10/2007 | Roudeau | B60W 30/188 701/60 |
| 2010/0089064 | A1 * | 4/2010 | Falkenstein | B60K 6/48 60/702 |
| 2010/0130321 | A1 * | 5/2010 | Eto | B60K 6/365 475/5 |
| 2012/0004832 | A1 * | 1/2012 | Falkenstein | F02D 41/126 701/104 |
| 2014/0172214 | A1 * | 6/2014 | Kim | B60W 20/10 701/22 |
| 2014/0350789 | A1 * | 11/2014 | Anker | B62D 15/025 701/41 |
| 2015/0120121 | A1 * | 4/2015 | Nobumoto | B60L 11/18 701/22 |
| 2015/0203117 | A1 * | 7/2015 | Kelly | B60K 31/02 701/91 |
| 2015/0353070 | A1 * | 12/2015 | Matsui | B60K 6/48 701/22 |
| 2016/0090095 | A1 * | 3/2016 | Momose | B60W 30/18172 701/83 |
| 2016/0090922 | A1 * | 3/2016 | Momose | B60T 8/17636 701/80 |

FOREIGN PATENT DOCUMENTS

| | | |
|---|---|---|
| KR | 10-2008-0054998 | 6/2008 |
| KR | 10-2010-0028403 | 3/2010 |
| KR | 10-1500245 B1 | 3/2015 |
| KR | 10-1558811 B1 | 10/2015 |
| KR | 10-1566755 B1 | 11/2015 |
| KR | 10-2016-0011072 A | 1/2016 |

* cited by examiner

CONTROL METHOD OF POWER TRAIN FOR HYBRID VEHICLE AND CONTROL SYSTEM FOR THE SAME

CROSS REFERENCE TO RELATED APPLICATION

The present application claims priority of Korean Patent Application No. 10-2016-0046372 filed on Apr. 15, 2016, the entire contents of which is incorporated herein for all purposes by this reference.

BACKGROUND

Field of the Invention

The present invention relates to a control method of a power train for a hybrid vehicle and a control system for the same, and more particularly, to a control method of a power train for a hybrid vehicle and a control system for the same for optimizing system efficiency of a power train when intervention for upshifting is required.

Description of the Related Art

A hybrid vehicle is a type of vehicle which uses at least two energy sources. Particularly, the hybrid vehicle receives a driving torque from a drive motor using electrical energy and an engine using fuel. Meanwhile, to improve fuel efficiency, kinetic energy of a vehicle is collected as electrical energy when coasting or deceleration of a vehicle is required and the collected electrical energy is used for driving the drive motor.

Therefore, the drive motor and a starter motor configured to start the engine operate as a generator and collect torque being transferred from an output shaft to electrical energy as occasion demands except when driving torque is already provided. An engine starter which is applied to the hybrid vehicle is referred to as a hybrid starter generator ("HSG"). As explained above, in the hybrid vehicle, the improvement of re-collection efficiency of energy and fuel efficiency through the drive motor or the HSG is an important factor for controlling a power train of the hybrid vehicle.

The foregoing is intended merely to aid in the understanding of the background of the present invention, and is not intended to mean that the present invention falls within the purview of the related art that is already known to those skilled in the art.

SUMMARY

The present invention provides a control method of a power train for a hybrid vehicle and a control system for the same for optimizing system efficiency of power sources based on an amount of required intervention when intervention for upshifting is required.

The control method of a power train for a hybrid vehicle according to the present invention to achieve the above described object may include determining, by a controller, whether an engine corresponds to an optimal operating point when intervention for upshifting is demanded during an hybrid electric vehicle (HEV) driving mode; determining, by the controller, whether an amount of demanded intervention is equal to or less than a value adding maximum intervention torques of a drive motor and an HSG when the engine corresponds to the optimal operating point; and determining, by the controller, each intervention torque of the drive motor and the HSG to adjust a whole energy-collect rate by the drive motor and the HSG to be a maximum value of the related amount of demanded intervention, and simultaneously, the value adding the intervention torques of the drive motor and the HSG satisfies the amount of demanded intervention when the amount of demanded intervention is equal to or less than the value adding maximum intervention torques.

The whole energy-collect rate may be determined by each energy-collect rate of the drive motor and the HSG and an intervention torque ratio between the drive motor and the HSG, and the each energy-collect rate may be determined by each revolutions per minute (RPM) and intervention torque of the drive motor and the HSG. The controller may be configured to determine the intervention tongue of the HSG by considering a ratio of torque being transferred from the HSG to the engine.

The control method may further include operating, by the controller, the drive motor and the HSG to each reach maximum intervention torque and operating the engine to adjust an intervention torque to correspond with a difference value between the amount of demanded intervention and the value adding maximum intervention torques when the amount of demanded intervention is greater than the value adding maximum intervention torques. The control method may further include determining, by the controller, a corrected amount of demanded intervention for reaching the optimal operating point of the engine in an intervention condition in response to determining that the engine does not correspond to the optimal operating point. The controller may be configured to determine the corrected amount of demanded intervention by adding a deviation value between an optimal engine torque for realizing the optimal operating point of the engine and a current engine torque to the amount of demanded intervention.

The control method may further include determining, by the controller, whether the corrected amount of demanded intervention is equal to or less than the value adding maximum intervention torques of the drive motor and the HSG; and adjusting, by the controller, an engine torque for the engine to reach the optimal operating point and determining each intervention toque of the drive motor and the HSG such that a whole energy-collect rate by the drive motor and the HSG becomes a maximum value of the corrected amount of demanded intervention, and simultaneously, the value adding maximum intervention torques satisfies the corrected amount of demanded intervention when the corrected amount of demanded intervention is equal to or less than the value adding maximum intervention torques. The control method may further include operating, by the controller, the drive motor and the HSG to each reach maximum intervention torque and operating, by the controller, the engine to adjust an intervention torque to correspond with a difference value between the corrected amount of demanded intervention and the value adding maximum intervention torques when the corrected amount of demanded intervention is greater than the value adding maximum intervention torques.

A control system of a power train for a hybrid vehicle according to the present invention to achieve the above described object may include an engine configured to provide a driving torque of a vehicle; a drive motor configured to provide a driving torque of a vehicle; an HSG connected with the engine; and a controller configured to determine whether the engine corresponds to an optimal operating point when intervention for upshifting is required during an HEV driving mode, determine whether an amount of demanded intervention is equal to or less than a value adding maximum intervention torques of the drive motor and the HSG when the engine corresponds to the optimal operating point, and determine each intervention torque of the drive motor and the HSG such that a whole energy-collect rate by the drive motor and the HSG becomes a maximum value of the amount of demanded intervention, and simultaneously, the value adding the intervention torques of the drive motor and the HSG satisfies the amount of demanded intervention when the amount of demanded intervention is equal to or less than the value adding maximum intervention torques.

According to the above mentioned control method of a power train for a hybrid vehicle and a control system for the same, when intervention is demanded to a power source by upshifting, system efficiency of the power source may be optimized based on an amount of demanded intervention. Particularly, when the engine corresponds to an optimal operating point, optimal energy efficiency may be realized when intervention is performed as intervention torque a drive motor and an HSG is determined such that the amount of demanded intervention is satisfied and a whole energy-collect rate becomes a maximum value of the amount of demanded intervention. Furthermore, when the engine does not correspond to the optimal operating point, the optimal energy efficiency may be effectively realized as intervention is performed by correcting the amount of demanded intervention, and simultaneously, the engine may reach the optimal operating point.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a transmission for a vehicle according to an exemplary embodiment of the present invention will be described with reference to the accompanying drawings.

Figure 1:
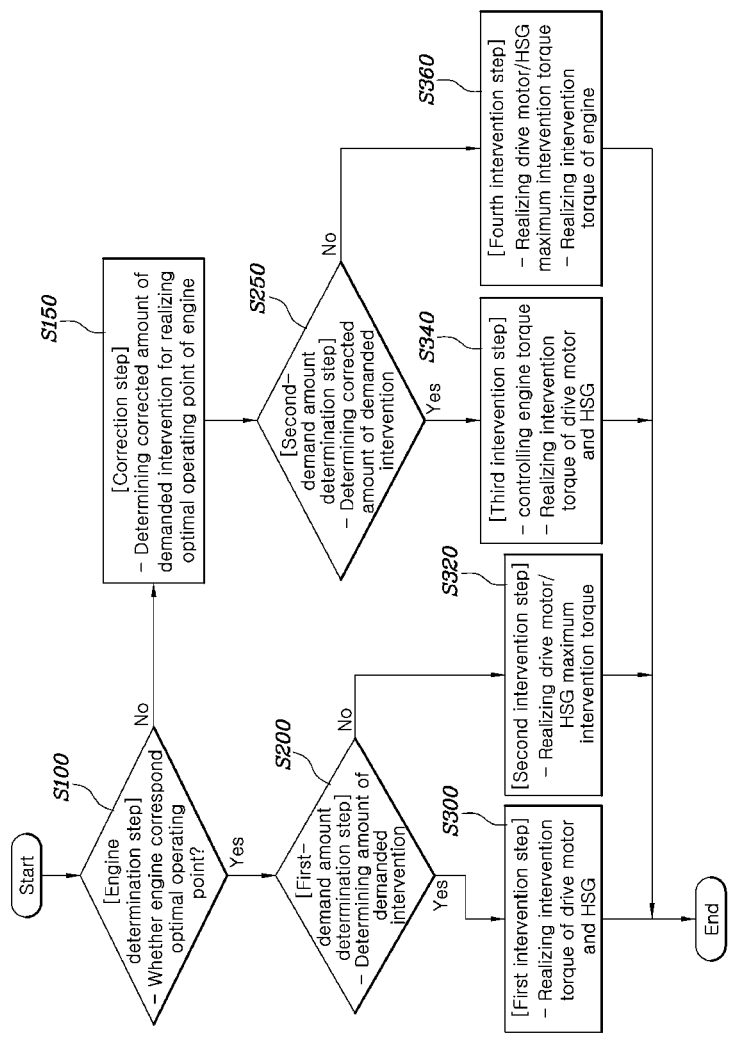
FIG. 1 is a flowchart representing a control method of a power train for a hybrid vehicle according to an exemplary embodiment of the present invention.
Figure 2:
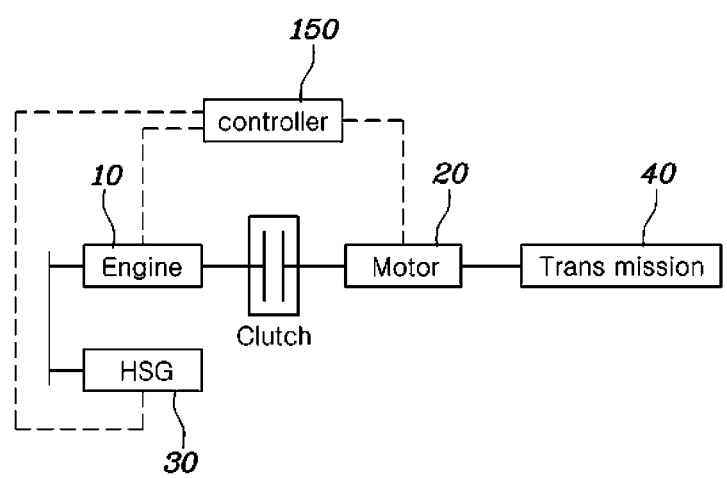
FIG. 2 is a drawing illustrating a control system of a power train for a hybrid vehicle according to an exemplary embodiment of the present invention.

A control method of a power train for a hybrid vehicle according to the present invention, as shown in FIG. 1 to FIG. 2, may include determining, by a controller 150, whether an engine 10 corresponds to an optimal operating point when intervention for upshifting is demanded during an HEV driving mode (S100); determining, by the controller 150, whether an amount of demanded intervention is equal to or less than a value adding maximum intervention torques of a drive motor 20 and an HSG 30 when the engine 10 corresponds to the optimal operating point (S200); and determining, by the controller 150, each intervention torque of the drive motor 20 and the HSG 30 to adjust a whole energy-collect rate by the drive motor 20 and the HSG 30 to be a maximum value of the amount of demanded intervention, and simultaneously, the value adding the intervention torques of the drive motor 20 and the HSG 30 satisfies the amount of demanded intervention when the amount of demanded intervention is equal to or less than the value adding maximum intervention torques (S300).

In particular, the controller 150 may be configured to determine whether the engine 10 corresponds to the optimal operating point when intervention for upshifting is demanded during the HEV driving mode. The intervention is to adjust a torque of a power source when requiring shifting gears to more easily synchronize a rotation speed of an input shaft of a transmission 40 and a rotation speed of a power shaft, which are formed by synchronous engage of a target shift stage.

Herein, the power source indicates all apparatuses to provide a driving torque for driving a vehicle, and the engine 10 and the drive motor 20 are the power sources according to the present invention as shown in FIG. 2. In addition, the power shaft indicates a rotating shaft of the power source which provides power to the transmission 40. Combination structures of the above mentioned engine 10, drive motor 20 and transmission 40 may variously exist, and as an exemplary embodiment of the present invention, the engine 10 and the drive motor 20 form a single power delivery system as shown in FIG. 2, and more exemplarily, a structure is provided that a driving torque may be transferred from the engine 10 to the drive motor 20 and then the driving torque may be transferred from the drive motor 20 to the transmission 40.

Meanwhile, when the upshifting is generated while a vehicle is driven, a rotation speed of the power shaft may be decreased based on a change of gear ratio, and intervention may be demanded for reducing a driving torque since the decrease of the rotation speed of the power shaft may be delayed as a driving torque being formed in the power shaft of the power source is to be increased, at this time, a torque amount for the reduction in the power shaft may be the amount of demanded intervention and a torque amount being absorbed or reduced in the each power source or the HSG 30 may each be the intervention torque.

For an electric vehicle (EV) mode in which the vehicle is driven by using electrical energy such as a driving torque from the drive motor 20, the amount of demanded intervention may be satisfied through the HSG 30 which is connected with the drive motor 20 or the engine 10. For an HEV mode in which the vehicle is driven by driving the engine 10 together with the drive motor 20, the amount of demanded intervention may be satisfied through each intervention torque of the engine 10, the drive motor 20, and the HSG 30. Particularly, the intervention torque of the drive motor 20 or the HSG 30 may be used as a regenerative torque which is collected to electrical energy to thus improve energy efficiency.

Furthermore, in the ordinary skill of the art, the drive motor 20 forms an intervention torque when the HEV mode is performed, and an intervention torque may be formed in the drive motor 20 and also the HSG 30 when an intervention torque is equal to or greater than a maximum value with which the drive motor 20 may operate. In addition, when the amount of demanded intervention is equal to or greater than a maximum value of an intervention torque by the drive motor 20 and the HSG 30, generally, torque reduction may be performed in the engine 10 such that the amount of demanded intervention is satisfied. However, since the above ordinary intervention type satisfies the amount of demanded intervention through the drive motor 20 or the HSG 30 by maintaining the engine torque even while the engine 10 does not correspond to the optimal operating point in relation between an engine torque and a current vehicle speed, engine efficiency is not optimized.

Accordingly, in the present invention, the controller 150 may be configured to determine whether the engine 10 is driven by an optimal engine torque to consider fuel consumption efficiency in the current vehicle speed (S100). The controller 150 may further be configured to determine whether an amount of demanded intervention is equal to or less than a value adding maximum intervention torques of the drive motor 20 and the HSG 30 when the engine 10 corresponds to the optimal operating point (S200).

As described above, when the engine 10 is already driven on the optimal operating point, the controller 150 may be configured to determine whether the amount of demanded intervention is able to be satisfied through an intervention torque which may be respectively realized in the drive motor 20 and the HSG 30 as it is advantageous to entire efficiency that a current driving condition of the engine 10 is maintained and the amount of demanded intervention is satisfied by using the drive motor 20 and the HSG 30. In the first intervention process S300, the controller 150 may be configured to determine each intervention torque of the drive motor 20 and the HSG 30 to adjust a whole energy-collect rate by the drive motor 20 and the HSG 30 to be a maximum value of the amount of demanded intervention, and simultaneously, the value adding the intervention torques of the drive 20 and the HSG 30 satisfies the amount of demanded intervention when the amount of demanded intervention is equal to or less than the value adding maximum intervention torques (at the first-demand amount determination process S200).

In the ordinary skill of the art, the drive motor 20 forms an intervention torque when the amount of demanded intervention is satisfied using the drive motor 20 or the HSG 30, however, the method of the related art may be inefficient since a higher energy-collect rate may be realized as the drive motor 20 and the HSG 30 simultaneously form an intervention tongue on the same condition. Therefore, in the present invention, when the current amount of demanded intervention is satisfied through the intervention torques of the drive motor 20 and the HSG 30, the intervention torque of the drive motor 20 is not formed, and intervention may be performed by respectively determining intervention torques of the drive motor 20 and the HSG 30 and thus, a whole energy-collect rate by the drive motor 20 and the HSG 30 may be adjusted to be a maximum value on the current amount of demanded intervention.

As described above, in the ordinary skill of the art (e.g., related art), the HSG 30 may form an intervention torque even while the amount of demanded intervention is satisfied by the drive motor 20 and an intervention torque of the HSG 30 may be formed to be greater than an intervention torque of the drive motor 20. As a result, in the present invention, when intervention is required as the upshifting is needed during the HEV driving mode, energy efficiency may be maximized in an entire power train in response to determining whether the engine 10 corresponds to the optimal operating point for performing intervention with ensuring energy efficiency to be different from the related art in which sequence of the power source for forming an intervention torque is predetermined to perform intervention and intervention torques of the drive motor 20 and the HSG 30 is determined such that a whole energy-collect rate is adjusted to a maximum value when intervention is performed by using the drive motor 20 and the HSG 30.

Meanwhile, in a control method of a power train for a hybrid vehicle according to an exemplary embodiment of the present invention, the whole energy-collect rate may be determined by each energy-collect rate of the drive motor 20 and the HSG 30 and an intervention torque ratio of the drive motor 20 and HSG 30, and each energy-collect rate may be determined by each RPM and intervention torque of the drive motor 20 and the HSG 30. As described above, intervention torques formed in the drive motor 20 and the HSG 30 may be used as a regenerative torque for generating electrical energy. The energy-collect rate of the drive motor 20 and the HSG 30 may vary based on each RPM and an intervention torque amount.

Furthermore, to determine the whole energy-collect rate, intervention torque ratio formed in an entire intervention torque by the drive motor 20 or the HSG 30 may be considered since a degree in which the each energy-collect rate contributes to the whole energy-collect rate may be represented based on a ratio of intervention torque which is respectively formed in the drive motor 20 or the HSG 30 in comparison with the entire intervention torque. In other words, the controller 150 may be configured to operate the drive motor 20 and the HSG 30 as the value adding the each intervention torque of drive motor 20 and HSG 30 is satisfied and an intervention torque may be determined such that the whole energy-collect rate determined by the above mentioned type is adjusted to the maximum value.

Meanwhile, in a control method of a power train for a hybrid vehicle according to an exemplary embodiment of the present invention, the controller 150 may be configured to determine the intervention torque of the HSG 30 by considering a ratio of a torque which is transferred from the HSG 30 to the engine 10. In other words, a degree in which the HSG 30 contributes to power delivery of the power train may correspond to a ratio of a torque being transferred to be made by connecting with the engine 10. When the HSG 30 uses a free intervention torque, the free intervention torque may correspond to a value of a torque being applied to the engine 10 and an amount of a torque, directly transferred to the rotating shaft of the HSG 30 through a member such as a pulley, may be varied by a ratio of the pulley.

Therefore, in an exemplary embodiment of the present invention, the intervention torque of the HSG 30 may be determined by considering the torque transfer ratio being formed between the HSG 30 and the engine 10 to calculate the intervention torque of the HSG 30 and then the control may be performed through the intervention torque of the HSG 30 to more accurately recognize and improve energy efficiency of the power train such as the whole energy-collect rate and so on.

Meanwhile, as shown in FIG. 1 to FIG. 2, the control method of a power train for a hybrid vehicle according to an exemplary embodiment of the present invention may further include operating, by the controller 150, the drive motor 20 and the HSG 30 to respectively realize a maximum intervention torque and operating the engine 10 to adjust an intervention torque to correspond with a difference value between the amount of demanded intervention and the value adding maximum intervention torques when the amount of demanded intervention is greater than the value adding maximum intervention torques (S320). When the amount of demanded intervention is greater than the value adding each maximum intervention torque of the drive motor 20 and the HSG 30 even when an engine torque corresponds to the optimal operating point of the engine 10, the intervention torque may be formed in the engine 10 for satisfying the amount of demanded intervention.

The intervention torque being realized in the engine 10 may not be used as a torque for collecting energy to be different from the drive motor 20 and the HSG 30, thus, it is advantageous that the intervention torque is adjusted as minimally as possible. Therefore, the drive motor 20 and the HSG 30 may realize the maximum intervention torque, and the engine 10 may be operated to adjust an intervention torque to correspond with a difference value between the value adding the intervention torques being realized by the drive motor 20 and the HSG 30 and the amount of demanded intervention.

Meanwhile, as shown in FIG. 1 to FIG. 2, the control method of a power train for a hybrid vehicle according to an exemplary embodiment of the present invention may further include determining, by the controller 150, a corrected amount of demanded intervention for realizing the optimal operating point of the engine 10 in an intervention condition in response to determining that the engine 10 does not correspond to the optimal operating point (S150). In other words, when the engine 10 is unable to realize an optimal engine torque for a current vehicle speed before intervention is demanded, it is advantageous to improve entire efficiency of the power train that both the intervention and the engine torque are realized with optimal values.

Therefore, when the engine 10 does not correspond to the optimal operating point, the controller 150 may be configured to simultaneously operate the intervention and the engine torque to correct or adjust the amount of demanded intervention to drive the engine 10 on the optimal operating point. The corrected amount of demanded intervention may be variously determined by considering an engine torque, a current vehicle speed, and maximum intervention torques the drive motor 20 and the HSG 30.

Furthermore, in the control method of a power train for a hybrid vehicle according to an exemplary embodiment of the present invention, the controller 150 may be configured to calculate the corrected amount of demanded intervention by adding a deviation value between an optimal engine torque to drive the engine 10 on the optimal operating point and a current engine torque to the amount of demanded intervention. In particular, an engine torque may be an optimal engine torque in a current engine RPM when a driving condition of the engine 10 corresponds to the optimal operating point as described above.

Therefore, in an exemplary embodiment of the present invention, the intervention may be performed, and simultaneously, the engine 10 may be driven on the optimal operating point as the corrected amount of demanded intervention is determined by considering a deviation value between a current engine torque and an optimal engine torque. In other words, as the corrected amount of demanded intervention is determined by adding a deviation value between a current engine torque and an optimal engine torque to the amount of demanded intervention, it is advantageous to increase efficiency of the engine 10 since the amount of demanded intervention may be satisfied even though an engine torque is changed to an optimal engine torque when the intervention is performed.

Meanwhile, as shown in FIG. 1 to FIG. 2, the control method of a power train for a hybrid vehicle according to an exemplary embodiment of the present invention may further include determining, by the controller 150, whether the corrected amount of demanded intervention is equal to or less than the value adding maximum intervention torques of the drive motor 20 and the HSG 30 (S250); and adjusting, by the controller 150, an engine torque to operate the engine 10 at the optimal operating point and determine each intervention toque of the drive motor 20 and the HSG 30 to adjust a whole energy-collect rate by the drive motor 20 and the HSG 30 to be a maximum value of the corrected amount of demanded intervention, and simultaneously, the value adding maximum intervention torques satisfies the corrected amount of demanded intervention when the corrected amount of demanded intervention is equal to or less than the value adding maximum intervention torques (S340).

In response to determining that the corrected amount of demanded intervention is less than the value adding each maximum intervention torque of the drive motor 20 and the HSG 30, the controller 150 may be configured to adjust an engine torque to an optimal engine torque. In other words, as an engine torque is adjusted such that the engine 10 corresponds to the optimal operating point, and a change amount of an engine torque being generated may be offset by the drive motor 20 and the HSG 30 with respect to the amount of demanded intervention, eventually, a driving torque being transferred to the transmission 40 may be consistently maintained. As the drive motor 20 and the HSG 30 take charge the intervention torque such as the amount of demanded intervention and a change amount of an engine torque, a driving tongue being transferred to the transmission 40 in quality satisfies the amount of demanded intervention being required from the transmission 40 even while the engine 10 is operating to correspond to the optimal operating point.

At this time, as described above, the controller 150 may be configured to determine the intervention torque such that the value adding intervention torques satisfies the corrected amount of demanded intervention and the whole energy-collect rate by the drive motor 20 and the HSG 30 becomes a maximum value to operate the engine 10, the drive motor 20, and the HSG 30. In particular, intervention torques may be determined using a data map which is already stored in a memory of the controller or by calculating in real time when intervention is required.

Meanwhile, as shown in FIG. 1 to FIG. 2, a control method of a power train for a hybrid vehicle according to an exemplary embodiment of the present invention may further include operating, by the controller 150, the drive motor 20 and the HSG 30 to each realize each maximum intervention torque and operating the engine 10 to adjust an intervention torque to correspond with a difference value between the corrected amount of demanded intervention and the value adding maximum intervention torques when the corrected amount of demanded intervention is greater than the value adding maximum intervention torques (S360). When the corrected amount of demanded intervention is equal to or greater than the value adding maximum intervention torques of the drive motor 20 and the HSG 30 even though the corrected amount of demanded intervention is determined for operating the engine 10 to correspond with the optimal operating point, as a result, the difference value is to be intervention torque which should be taken charge by the engine 10.

Therefore, the drive motor 20 and the HSG 30 may be operated to realize the maximum intervention torque and the engine 10 may be operated so that the intervention torque is realized as the difference value between the adding value of the maximum intervention torque and the corrected amount of demanded intervention. In particular, an engine efficiency may be improved as the amount of demanded intervention is corrected since an engine torque as the result that the engine 10 takes charge the intervention torque may have a value close an optimal engine torque in comparison with an engine torque as the result that the intervention is performed without correcting the amount of demanded intervention.

Meanwhile, as shown in FIG. 2, a control system of a power train for a hybrid vehicle according to the present invention may include an engine 10 configured to provide a driving torque of a vehicle; a drive motor 20 configured to provide a driving torque of a vehicle; an HSG 30 connected with the engine 10; and a controller 150 configured to determine whether the engine 10 corresponds to an optimal operating point when intervention for upshifting is required during a HEV driving mode, determine whether an amount of demanded intervention is equal to or less than a value adding maximum intervention torques of the drive motor 20 and the HSG 30 when the engine 10 corresponds to the optimal operating point, and determine each intervention torque of the drive motor 20 and the HSG 30 to adjust a whole energy-collect rate by the drive motor 20 and the HSG 30 to a maximum value of the amount of demanded intervention, and simultaneously, the value adding the intervention torques of the drive 20 and the HSG 30 satisfies the amount of demanded intervention when the amount of demanded intervention is equal to or less than the value adding maximum intervention torques.

In particular, the engine 10 and the drive motor 20 may be configured to supply a driving torque of a vehicle. In the present invention, the engine 10 and the drive motor 20 may be provided to a structure forming a single driving torque being transferred to the transmission 40 as shown in FIG. 2.

In FIG. 2, a structure, in which the drive motor 20 may be connected with a rotating shaft of the engine 10 and an input shaft of the transmission 40 may be connected with a rotating shaft of the drive motor 20 to transfer a driving torque by the engine 10 and the drive motor 20 through the transmission 40, is illustrated. Meanwhile, the HSG 30 may be connected with the engine 10 to perform a cranking of the engine 10. After the engine 10 is started, the HSG 30 may operate as a generator configured to generate electrical energy using a part of torque being formed in the rotating shaft of the engine 10 depending on necessity.

Meanwhile, the controller 150 may be configured to determine whether the engine 10 corresponds to an optimal operating point when intervention for upshifting is requited during an HEV driving mode, to determine whether an amount of demanded intervention is equal to or less than a value adding maximum intervention torques of the drive motor 20 and the HSG 30 when the engine 10 corresponds to the optimal operating point, and to determine each intervention torque of the drive motor 20 and the HSG 30 to adjust a whole energy-collect rate by the drive motor 20 and the HSG 30 to a maximum value of the amount of demanded intervention, and simultaneously, the value adding the intervention torques of the drive motor 20 and the HSG 30 satisfies the amount of demanded intervention when the amount of demanded intervention is equal to or less than the value adding maximum intervention torques. The controller 150 may be configured to operate the engine 10 and the drive motor 20 to perform an intervention process in the present invention when receiving from the transmission controller.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A control method of a power train for a hybrid vehicle, comprising:
   determining, by a controller, whether an engine corresponds to an optimal operating point when intervention for upshifting is demanded during a hybrid electric vehicle (HEV) driving mode;
   determining, by the controller, whether an amount of demanded intervention is equal to or less than a value which is a sum of maximum intervention torques of a drive motor and a hybrid starter-generator (HSG) when the engine corresponds to the optimal operating point; and
   determining, by the controller, each intervention torque of the drive motor and the HSG to adjust a whole energy-collect rate by the drive motor and the HSG to a maximum value of the amount of demanded intervention, and simultaneously, a value which is a sum of the intervention torques of the drive motor and the HSG satisfies the amount of demanded intervention when the amount of demanded intervention is equal to or less than the value adding maximum intervention torques,
   wherein the whole energy-collect rate is determined by each energy-collect rate of the drive motor and the HSG and an intervention torque ratio between the drive motor and the HSG.

2. The control method of claim 1, wherein the each energy-collect rate is determined by each revolutions per minute (RPM) and intervention torque of the drive motor and the HSG.

3. The control method of claim 1, wherein the controller is configured to determine the intervention torque of the HSG by considering a ratio of torque being transferred from the HSG to the engine.

4. The control method of claim 1, further comprising:
operating, by the controller, the drive motor and the HSG to each realize maximum intervention torque and operating the engine to adjust an intervention torque to correspond with a difference value between the amount of demanded intervention and the value adding maximum intervention torques when the amount of demanded intervention is greater than the value adding maximum intervention torques.

5. The control method of claim 1, further comprising:
determining, by the controller, a corrected amount of demanded intervention for realizing the optimal operating point of the engine in an intervention condition in response to determining that the engine does not correspond to the optimal operating point.

6. The control method of claim 5, wherein the controller is configured to determine the corrected amount of demanded intervention by adding a deviation value between an optimal engine torque for realizing the optimal operating point of the engine and a current engine torque to the amount of demanded intervention.

7. The control method of claim 5, further comprising:
determining, by the controller, whether the corrected amount of demanded intervention being is equal to or less than the value adding maximum intervention torques of the drive motor and the HSG; and
adjusting, by the controller, an engine torque of the engine to the optimal operating point and determining each intervention toque of the drive motor and the HSG to adjust a whole energy-collect rate by the drive motor and the HSG to a maximum value of the corrected amount of demanded intervention, and simultaneously, the value adding maximum intervention torques satisfies the corrected amount of demanded intervention when the corrected amount of demanded intervention is equal to or less than the value adding maximum intervention torques.

8. The control method of claim 7, further comprising:
operating, by the controller, the drive motor and the HSG to each realize maximum intervention torque and operating the engine to adjust an intervention torque to correspond with a difference value between the corrected amount of demanded intervention and the value adding maximum intervention torques when the corrected amount of demanded intervention is greater than the value adding maximum intervention torques.

9. A control system of a power train for a hybrid vehicle, comprising:
an engine configured to provide a driving torque of a vehicle;
a drive motor configured to provide a driving torque of a vehicle;
a hybrid starter-generator (HSG) connected with the engine; and
a controller configured to:
determine whether the engine corresponds to an optimal operating point when intervention for upshifting is required during a hybrid electric vehicle (HEV) driving mode;
determine whether an amount of demanded intervention is equal to or less than a value which is a sum of maximum intervention torques of the drive motor and the HSG when the engine corresponds to the optimal operating point; and
determine each intervention torque of the drive motor and the HSG to adjust a whole energy-collect rate by the drive motor and the HSG to a maximum value of the amount of demanded intervention, and simultaneously, a value which is a sum of the intervention torques of the drive motor and the HSG satisfies the amount of demanded intervention when the amount of demanded intervention is equal to or less than the value adding maximum intervention torques,
wherein the whole energy-collect rate is determined by each energy-collect rate of the drive motor and the HSG and an intervention torque ratio between the drive motor and the HSG.

* * * * *